United States Patent [19]

Funk et al.

[11] Patent Number: 5,016,004

[45] Date of Patent: May 14, 1991

[54] GAS OPERATED VEHICULAR CONTROL SYSTEM

[75] Inventors: John W. Funk; David H. Saint, both of Medicine Hat, Canada

[73] Assignee: Her Majesty the Queen in right of Canada, as represented by the Minister of National Defence, Canada

[21] Appl. No.: 289,044

[22] Filed: Dec. 23, 1988

[30] Foreign Application Priority Data

Dec. 24, 1987 [CA] Canada .................................. 555425

[51] Int. Cl.$^5$ .............................................. H04B 1/00
[52] U.S. Cl. .............................. 340/825.69; 180/6.48; 180/6.7; 273/359; 358/103
[58] Field of Search ...................... 180/167, 6.48, 6.7; 273/359, 348.1, 86 R, 86 B; 434/16, 63, 69; 358/103; 340/825.69

[56] References Cited

U.S. PATENT DOCUMENTS

| | | | |
|---|---|---|---|
| 2,990,900 | 7/1961 | Palsson | 180/6.48 |
| 3,917,270 | 11/1975 | Gothard, Jr. et al. | 273/359 |
| 4,126,312 | 11/1978 | Kreuzer et al. | 273/359 |
| 4,155,554 | 5/1979 | Adamski et al. | 273/359 |
| 4,619,615 | 10/1986 | Kratzenberg | 434/22 |
| 4,789,036 | 12/1988 | Haas | 180/6.48 |
| 4,817,948 | 4/1989 | Simonelli | 273/86 B |
| 4,837,694 | 6/1989 | Narita et al. | 364/426.01 |

Primary Examiner—Donald J. Yusko
Assistant Examiner—Dervis Magistre
Attorney, Agent, or Firm—Roylance, Abrams, Berdo & Goodman

[57] ABSTRACT

A remotely controlled mobile target for weapons training involves a commercially available all-terrain-vehicle carrying a ½ scale target shell (e.g. a tank). The vehicle has a motor and a brake-generated skid steering system. A video camera mounted on the vehicle provides the operator at the remote station with a visual image of the vehicle's progress and in response thereto the operator, using a joystick controller, can send command signals to the vehicle to control operation of the streering system and the motor. Three-way solenoid valves, connected to the hydraulic brake system, a source of compressed gas and the electronic controller operate in response to the command signals to effect operation of the brakes for steering or braking. The target is inexpensive, easy to operate and closely simulates the operation of a highly maneuverable, fast vehicle, such as a tank.

31 Claims, 3 Drawing Sheets

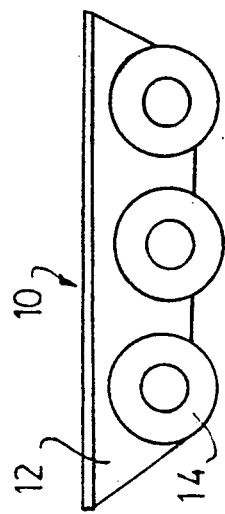
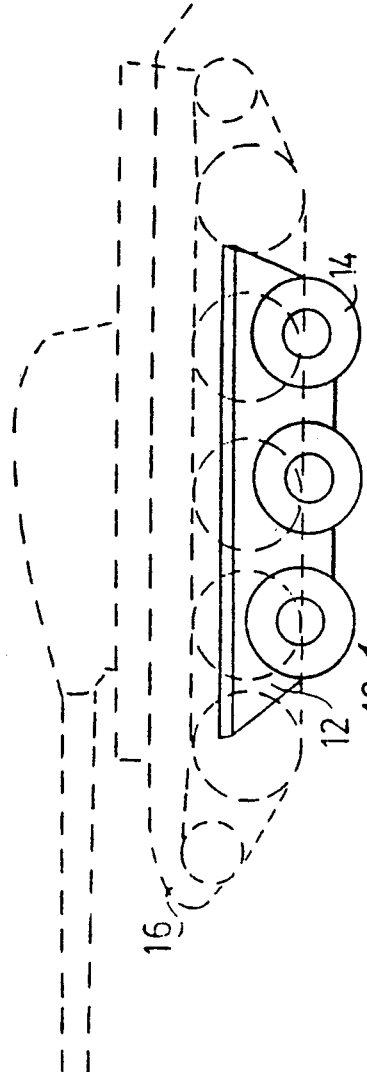
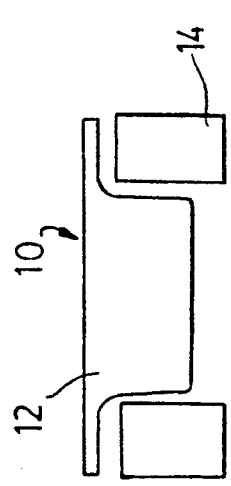
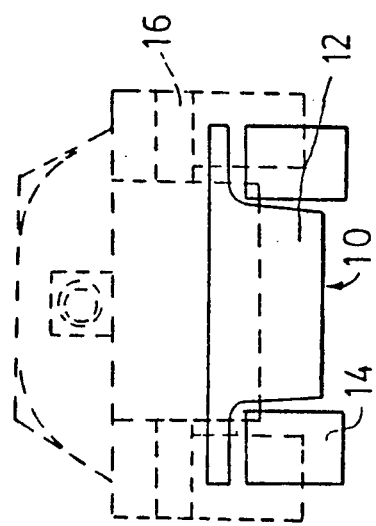

GAS OPERATED VEHICULAR CONTROL SYSTEM

The present invention relates to a remote control vehicle and to a system for remotely controlling the vehicle. In particular, the vehicle is one which can be used as a mobile target on a gunnery or weapons testings range.

BACKGROUND OF THE INVENTION

Modern armed forces are provided with sophisticated weaponry. Nevertheless, one of the mainstays of a mobile army is the tank and the newest tanks are highly maneuverable, fast, and difficult to neutralize. It is very desirable to have as much practice in anti-tank warfare as possible and it is also very desirable to test the latest in anti-tank weaponry under conditions which approach, as much as possible, true battlefield conditions.

At the moment there are no commercially available targets which can be remotely controlled and which will adequately simulate a modern tank. Real tanks, especially those of an "enemy", are not readily available.

SUMMARY OF THE INVENTION

The present invention overcomes the problem indicated above by providing an inexpensive remotely controlled target vehicle which can be adapted to any desired configuration, including one simulating a tank; which is fast and highly maneuverable; and which can be controlled easily by individuals having little or no experience with remote control.

The vehicle of the present invention is based on a commercially available all-terrain-vehicle (ATV) having a moulded plastic body, a set of drive wheels on each side, a drive motor supplying power to the wheels, and a brake-operated skid steering system. The vehicle carries a forwarding-looking video camera, a set of solenoid-operated valves for controlling the brakes, a throttle or speed control for the motor and an electronics package that includes an antenna for transmitting a video signal, an antenna for receiving command signals, and means for reacting to the command signals to operate the brakes and throttle as desired to maneuver the vehicle along a desired course.

A remote station includes a video receiving antenna connected to a video monitor so that the operator can see the progress of the vehicle. The operator has a joystick or other controller that generates the command signals that are transmitted to the vehicle as directional and speed control signals. Thus, the video camera puts the operator into the "driver's" seat and he is able to completely control the vehicle through the test course.

The system described above is relatively inexpensive. It also lends itself to target simulation since the vehicle can accept and carry a ½ scale tank shell constructed from a tubular aluminum frame with a fabric (e.g. Nylon) stretched over it. The shell can also include a fibreglass turret and an aluminum barrel. Since target acquisition and tracking is often accomplished using imaging equipment, the shape, size and electro-optical emissions of the target should simulate as much as possible a full size tank. For example, passive radar augmentation can be used to obtain a tank equivalent radar cross-section and I.R. emissions can also be simulated. Also, a ½ scale target permits the utilization of a miss distance scoring system to determine whether a "hit" on a full size tank would have occurred. Such a system would also help determine possible boresight misalignments or systematic errors occuring with any particular weapon or operator. Since projectile ground impact is usually visible and would occur close to the target on a near miss, a telephoto video camera mounted near the weapon and tracking the target would likely suffice to determine miss distance for missiles and larger caliber weapons. Since many misses would actually be scored as "hits" the cost of the target per "hit", on average, will be much less than for a full scale target.

One aspect of the invention which permits the vehicle to operate effectively in the mechanism for controlling the brakes of the skid-steering system. A three-way valve is positioned in each brake line so that they can be switched to accept hydraulic fluid from the master cylinders of the manual system, if the vehicle is to be driven by an on-board operator, or from a remote steering system if the vehicle is to be driven from the remote system. The vehicle carries a source of compressed gas which can be directed to left and right hydraulic reservoirs to selectively pressurize the reservoirs and use the hydraulic fluid therein to operate the brakes for steering or stopping the vehicle. A pair of solenoid-operated three-way valves receive signals from the electronics package for selective opening to pressurize the reservoirs with the pressurized fluid opening the brake(s). When the solenoid-operated valves revert to their normally closed state they vent the reservoirs to atmosphere to release the brake(s).

The present invention will provide control of the target over a range of about 6 km. The vehicle can carry enough fuel, electrical energy (batteries) and compressed gas to operate the brake-operated skid steering system for about 6 to 8 hours of operation.

The invention will now be described in greater detail and with reference to the drawings.

BRIEF DESCRIPTION OF THE DRAWINGS

FIGS. 1 nd 2 show front and side views of the basic vehicle used with this invention, FIGS. 3 and 4 show front and side views of the basic vehicle in combination with a half-scale mock tank body.

DESCRIPTION THE PREFERRED EMBODIMENT

FIGS. 1 and 2 show in rough outline the general shape and character of a commercially available vehicle which is suitable as the chassis for a remotely controlled target vehicle in accordance with this invention. The vehicle 10 includes a moulded body 12, three driven wheels 14 on each side thereof and, internally thereof, a drive motor, not shown. A suitable vehicle is the "ARGO" (trademark of Ontario Drive & Gear Ltd ) which, with appropriate gearing and an appropriate motor, is capable of speeds in excess of 30 miles per hour. The optional hydraulic brake skid steering system of this vehicle lends itself very well to remote control as described hereinbelow. The vehicle provides all weather mobility on a test range and its dimensions are such that it can support a ½ scale tank shell 16, as shown in dotted lines in FIGS. 3 and 4. Of course, other types of targets, larger or smaller than the tank shell, could be mounted on the vehicle 10.

Figure 5:
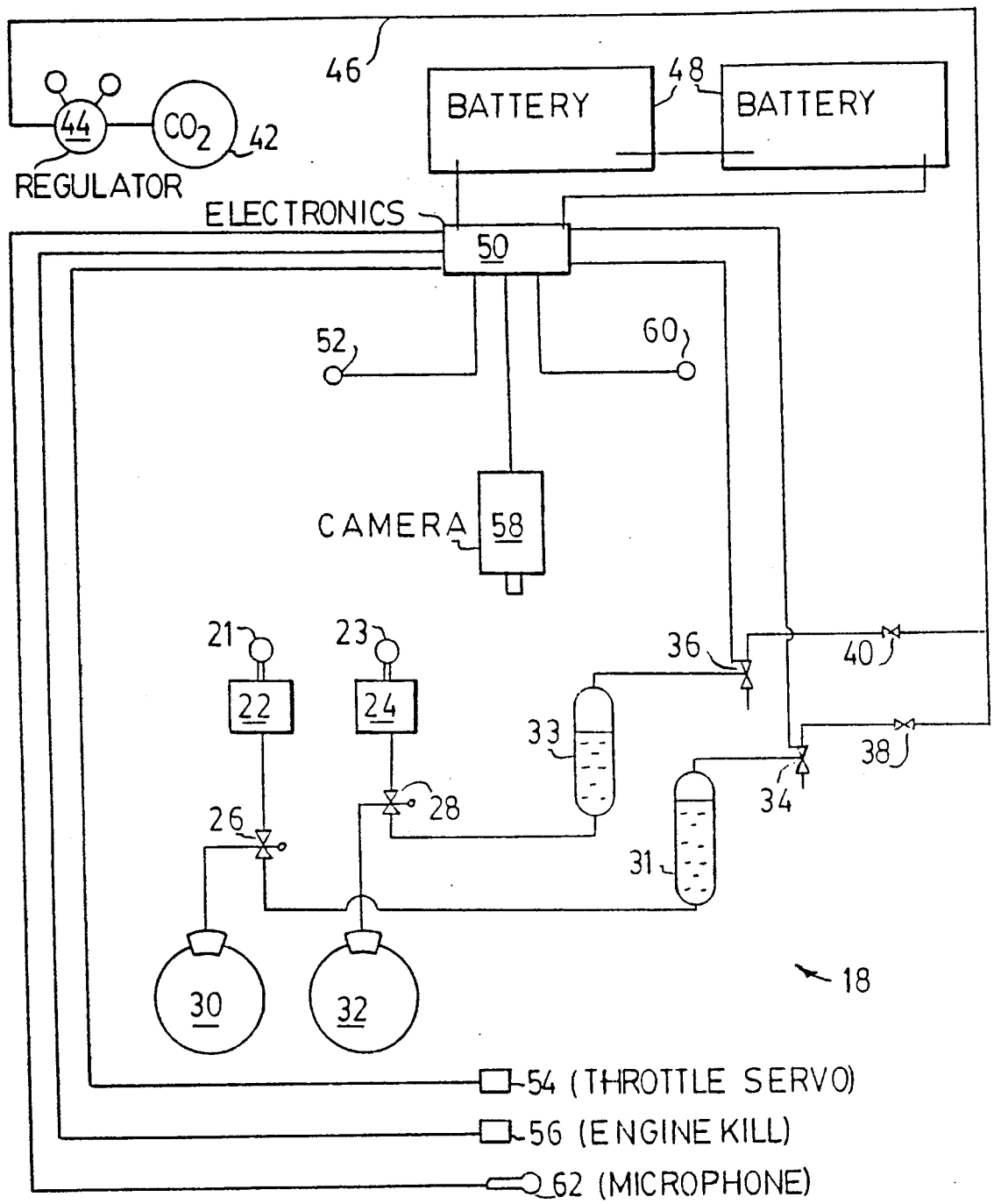
FIGS. 5 and 6 shows schematically the remote control system of the present invention.
Figure 6:
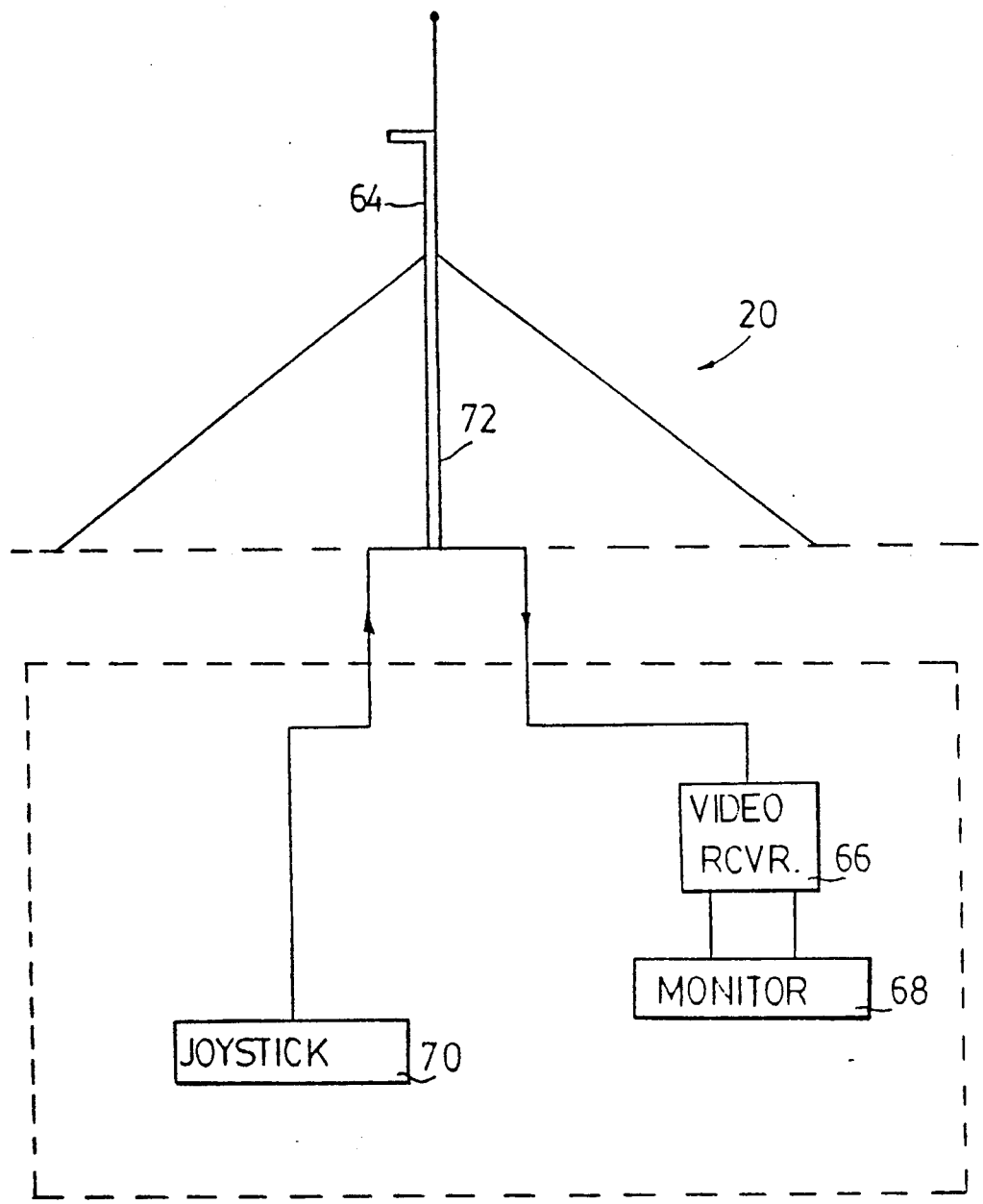

FIG. 5 illustrates schematically the vehicle control portion 18 and FIG. 6 illustrates the remote station portion 20 of the remote control system of the present invention.

As indicated previously, the vehicle 10 is purchased with an optional hydraulic brake skid steering system. This means that in order to turn to the left or right the brakes on the left or the right of the vehicle are applied to slow the wheels on the left or right, respectively. The brake application system as provided by the manufacturer applies hydraulic pressure proportionally so that turns of different radius can be accomplished. The sharpest turn will result when the brakes on one side are applied so as to lock the wheels so that the braked wheels are completely rotationally stopped.

Before modification the vehicle has manual brake/-steering control via left and right levers 21, 23 operating master hydraulic fluid cylinders 22, 24 to operate left or right brakes 30, 32. After modification the brake lines leading from the master cylinders 22, 24 to the brakes 30, 32 each contain a manually operated 3-way valve 26, 28. A switch for each valve 26, 28 is provided in the vehicle so that in one position (manual) the brake lines are connected to the master cylinders 22, 24 respectively and in the other position (remote) they are connected to new hydraulic fluid reservoirs 31, 33 respectively.

The reservoirs 31, 33 are connected to solenoid operated 3-way valves 34, 36 respectively, each valve being electrically controlled from the electronics package 50. A compressed gas such as carbon dioxide ($CO_2$) is provided in a suitable container, such as a pressure bottle 42. The compressed gas is supplied via a regulator 44 and a suitable line 46 to the solenoid valves 34, 36. Restricting orifices 38, 40 are provided upstream of the valves 34, 36 to provide a ramp brake pressure increase since the on-off control provided by the solenoids of the valves 34, 36 is too sensitive for proper control at high speeds. This creates a pseudo-proportional control system.

Storage batteries 48 are coupled together and provide electrical power to the electronic command package 50 which contains appropriate circuitry to perform the necessary functions. The circuitry per se is either commercially available or is well within the capabilities of any competent engineer or technician and need not be described other than with respect to its function The package 50 contains receiver circuitry so that it can receive command signals from the remote station 20 via command receiver antenna 52 and direct those signals as required. The signals as received would control either or both of the brakes 30, 32, as discussed below, to either steer or stop the vehicle. Other signals would operate a throttle servo 54 or other speed control connected to the drive motor 55 to control the speed of the vehicle as it moves over the test range. Finally, another signal would cause a relay mechanism 56 to shut the drive motor down in the event of a problem or unsafe condition arising with the vehicle.

When operated manually with an operator on board the valves 26, 28 are switched so that the manual steering controls 21, 22; 23, 24 can be selectively operated to, in turn, hydraulically apply the brakes 30, 32 to steer or brake the vehicle. When the vehicle is to be operated remotely the valves 26, 28 are switched to their "remote" condition and the $CO_2$ bottle is opened to pressurize the line 46 The electronic command package 50, upon receipt cf an appropriate signal would cause one or both of the 3-way valves 34, 36 to open to admit pressurized gas into one or both of the reservoirs 31, 33. Such pressurized gas would force hydraulic fluid out of the appropriate reservoir and through the corresponding valve 26, 28 to operate the appropriate brake(s) 30, 32. When the steering or braking command is terminated the valves 34, 36 revert to their normally closed position, in which the reservoirs are vented to atmosphere, thereby relieving the pressure therein and releasing the brake(s) 30, 32.

The other portion of the electronic circuitry relates to the video monitoring aspects of the invention. A video camera 58 is mounted in a forward-looking position on the vehicle (about 6 feet above the ground) so that it has a reasonably wide field of view by way of a wide-angle lens. The video signal is processed by the electronics circuitry and is transmitted via an antenna 60 mounted on the vehicle back to the remote station 20. Optionally, a microphone 62 may be positioned adjacent the drive motor with the audio signal also being transmitted back to the remote station via antenna 60. The operator can monitor the sounds of the drive motor and more accurately control the throttle than if he were relying only on visual input.

At the remote station 20, which may be up to 6 km away from the vehicle, a tall (about 40 feet) video receiver antenna 64 is used to receive the video and audio signals transmitted from the camera 58 and the microphone 62. Those signals are fed to a video receiver 66 which, in turn, provides audio and video signals to a video monitor 68. The operator watching the monitor will see the terrain in front of the vehicle just as if he were sitting in the driver's seat on the vehicle and he will also hear and find himself reacting to the operating sound of the drive motor.

At the remote command station the operator will have a joystick-type of controller and transmitter 70. Movement of the joystick to the left or right will be translated into appropriate signals which, in turn, are transmitted back to the vehicle via a command transmitter antenna 72. The operator also has the ability to operate the drive motor faster or slower or to shut it off completely.

Experience has shown that by watching and listening to the monitor an operator can properly and effectively operate the remote vehicle with only about five minutes of practice.

The simplicity and cost effectiveness of the present invention is evident from the fact that many of the components are available "off-the-shelf". For example, the prototype vehicle used a standard hobby radio transmitter (15 watts maximum transmitted power) as part of the package 50. It was coupled to an electronic interface for converting the pulse width modulated command signals to appropriate electrical control actuation signals. A 20 watt microwave video transmitter sent the video and audio signals to a compatible receiver at the remote station. A directional video receive antenna (11 db gain) with a low noise amplifier and a low loss cable going from the antenna to the receiver should permit about 6 km separation between the vehicle 10 and the remote station 20.

In addition to the throttle kill switch or mechanism 56 it is possible to use normally-open solenoid valves so that a loss of electrical power would cause the valves 34, 36 to open immediately to apply all brakes and stop the vehicle.

The vehicle can be operated on the basis of several parameters. For example a test course could be laid out beforehand using a ribbon or any other marker set out along the course. The operator would be able to see the marker(s) and follow accordingly. The operator might also follow a course laid out on a map, using the video system to avoid dangerous situations. Alternatively, the vehicle could be driven manually over the course to establish a set of tracks made by the vehicle's wheels or tracks themselves. The operator could then follow the track-set course, visually and remotely later. This technique is useful in wintertime as the tracks will be readily seen in the snow.

In summary, the present invention provides a reasonably inexpensive, highly maneuverable remotely controllable vehicle and a remote control system which permits economical weapons testing and practice. The vehicle can be adapted to simulate various mobile targets and the operation thereof will be very realistic using the described remote control system.

It is expected that skilled practitioners could modify the vehicle and/or the system for enhancement thereof without departing from the spirit of the invention. The protection to be afforded the invention is to be determined from the claims appended hereto.

The embodiments of the invention in which an exclusive property or privilege is claimed are defined as follows:

1. A system for controlling, from a remote station, the operation of a vehicle having a body, a suspension system, an hydraulic brake-operated skid steering system, and a drive motor, comprising:
   on the vehicle
   a video transmission system,
   an electronic command reception system including electronic control means for accepting electronic command signals and operating said steering system in response to said signals,
   a source of compress gas,
   a source of electrical energy connected to said electronic control means, and
   a pair of three-way solenoid-operated first valves on said vehicle, each valve being connected to said source of compressed gas, to said electronic control means and hydraulically to brakes of the vehicle on an appropriate side thereof; and
   at the remote station
   a video monitoring system, and
   an electronic transmission system for sending said electronic command signals to said electronic command reception system on said vehicle;
   whereby an operator at said station can monitor the progress of said vehicle via said video systems and control the movements of said vehicle via said electronic systems.

2. The control system of claim 1 wherein said video transmission system includes a forward-looking video camera and a video transmission antenna mounted on said vehicle, and wherein said video monitoring system includes a video reception antenna and a video monitor connected thereto at said remote station.

3. The control system of claim 1 wherein said vehicle includes manual control levers connected hydraulically to said brakes by way of a pair of second three-way valves, said second valves being switchable to accept input via said manual levers or via said first three-way valves.

4. The control system of claim 3 including a reservoir of hydraulic fluid connected to corresponding first and second three-way valves whereby compressed gas admitted to a reservoir by an opened first valve will pressurize the reservoir and cause the hydraulic fluid therein to pass by the corresponding second valve to operate the rakes connected thereto, closure of the first valve serving to vent the reservoir to atmosphere to release the previously operated brakes.

5. The control system of claim 4, including a restricting orifice positioned between the source of compressed gas and each solenoid valve and a pressure regulator connected to said source of compressed gas.

6. The control system of claim 5, including a throttle servo and an engine kill means connected to said drive motor and to said electronic control means for controlling the operation of said motor.

7. The control system of claim , including a reception antenna mounted on said vehicle and connected to said electronic control means, and a microphone positioned adjacent said motor and connected to the audio input of said video camera.

8. The control system of claim 2, wherein said video monitor at said remote station will display terrain ahead of said vehicle so that said operator can have visual input on the basis of which he can remotely steer said vehicle, and wherein said monitor will also reproduce sounds emanating from said motor, reported via said microphone, whereby said operator can have audio input on the basis of which he can control the speed of said vehicle.

9. The control system of claim 8 wherein said electronic transmission system includes a command transmission antenna and command controller means which provides said command signals in response to manipulation by said operator.

10. A vehicle adapted for control from a remote station, said vehicle including a body, a suspension system, an hydraulic brake-operated skid steering system, and a drive motor, comprising: a forward looking video camera mounted on said body; a source of compressed gas; a source of electrical energy; video transmission and command reception antennas mounted on said body; electronic control means connected to said camera and said antennas; and a pair of solenoid-operated first valves connected to said control means, said source of compressed gas and said brake-operated steering system, there being one valve for the brake-operated steering system on each side of the vehicle, the operation of said steering system being controlled hydraulically by gas passing through the appropriate one of said valves.

11. The vehicle of claim 10 including manual control means connected hydraulically to brakes of said brake-operated steering system by way of a pair of second valves, said second valves being switchable to accept input via manual control means or via said first valves.

12. The vehicle of claim 11 including a reservoir of hydraulic fluid connected to corresponding first and second valves whereby compressed gas admitted to a reservoir by an opened first valve will pressurize the reservoir and cause the hydraulic fluid therein to pass by the corresponding second valve to operate the brakes connected thereto, closure of the first valve serving to vent the reservoir to atmosphere to release the previously operated brakes.

13. The vehicle of claim 12 including restricting orifice means positioned between the source of compressed gas and each first valve to provide a ramp pressure increase to the appropriate brakes upon operation of the corresponding one of said first valves.

14. The vehicle of claim 13 wherein said electronic control means is connected to said drive motor to control the speed thereof and a microphone positioned adjacent said motor is connected to an audio input jack of said camera.

15. The vehicle of claim 14 including pressure regulator means connected to said source of compressed gas.

16. The vehicle of claim 10 wherein said body is adapted to carry a body shell thereon, which shell is shaped to simulate a vehicular target.

17. The vehicle of claim 16 wherein said shell is in the shape of a tank.

18. A remotely controllable vehicle intended for use as a mobile target comprising: a vehicular body carrying a drive motor, a suspension system, a plurality of drive wheels on each side thereof, and a hydraulic brake-operated skid steering system; a shell simulating a selected target carried by said body; a forward-looking video camera mounted on said body; a source of compressed gas; a source of electrical energy; video transmission and command reception antennas; electronic control means connected to said video camera and said antennas; and a solenoid-operated three-way first valve for each plurality of drive wheels, each valve being connected to said electronic control means, said source of compressed gas and a respective hydraulic brake system, each valve being operable in response to a command signal received by said reception antenna and transmitted thereto by said control means to, in turn, cause operation of the steering system connected thereto by gas passing therethrough.

19. The vehicle of claim 18 including manual control means connected hydraulically to the brakes of said brake-operated steering s stem by way of a pair of second valves, said second valves being switchable to accept input via said manual control means or via said first valves.

20. The vehicle of claim 19 including a reservoir of hydraulic fluid connected to corresponding first and second valves whereby compressed gas admitted to a reservoir by an opened first valve will pressurize the reservoir and cause the hydraulic fluid therein to pass by the corresponding second valve to operate the brakes connected thereto, closure of the first valve serving to vent the reservoir to atmosphere to release the previously operated brakes.

21. The vehicle of claim 20 including restricting orifice means positioned between the source of compressed gas and each first valve provide a ramp pressure increase to the hydraulic brake systems upon operation of the corresponding one of said first valves.

22. The vehicle of claim 21, wherein said electronic control means is connected to said drive motor to control the speed thereof and a microphone positioned adjacent said motor is connected to an audio input jack of said camera.

23. The vehicle of claim 22, including pressure regulator means connected to said source of compressed gas.

24. A system for remotely controlling, from a remote station, the operation of a vehicle having a body, a suspension system, a hydraulic brake-operated skid steering system, and a drive motor, comprising:
(A) on the vehicle:
   (a) a source of compressed gas;
   (b) a source of electrical energy;
   (c) a forward-looking video camera positioned above said body;
   (d) a video transmission antenna;
   (e) a pair of three-way solenoid valves, each being connected to said source of compressed gas and each being connected hydraulically to brakes of the vehicle on an appropriate side thereof;
   (f) electronic control means connected to said valves, said antenna, said camera, and said source of electrical energy;
   (g) throttle servo connected between said electronic control means said drive motor; and
   (h) a command reception antenna connected to said electronic control means; and
(B) at the remote station:
   (i) a video reception antenna;
   (ii) a command signal transmission antenna;
   (iii) a video monitor connected to said video reception antenna; and
   (iv) a command controller connected to said command signal transmission antenna;
whereby an operator at the remote station can control the operation of said vehicle by observing the progress thereof via a video link extending from said camera to said monitor and by operating said steering system and drive motor via a command link extending from said controller to said electronic control means.

25. The system of claim 24 wherein said vehicle body is adapted to carry thereon a three-dimensional shell simulating a selected target, such as a tank.

26. The system of claim 25, wherein said shell may be reduced in size relative to a full size version of said selected target.

27. The system of claim 24, including a restricting orifice between the source of compressed gas and each valve to provide a ramp pressure increase for proportional control of said steering system.

28. The system of claim 27, including microphone means positioned adjacent said motor and connected to an audio input of said camera for transmission of an audio signal back to the operator at the remote station.

29. A system for remotely controlling a vehicle having an hydraulically-operated skid-steering system including manual control means normally connected hydraulically to respective brakes on each side of the vehicle, said remote control system comprising:
   (a) control signal receiving means;
   (b) a source of compressed gas;
   (c) a pair of normally closed solenoid-operated first valves connected to said signal receiving means and to said source of compressed gas;
   (d) a pair of hydraulic fluid reservoirs each being connected to a corresponding one of said first valves; and
   (e) a pair of second valves, each being connected between the manual control means and the corresponding brakes and also being connected a corresponding one of said reservoirs, each second valve being switchable to accept hydraulic input from either the manual control means or the corresponding reservoir; whereby for remote operation opening of a first valve in response to a control signal will permit pressurized gas to pressurize the corresponding reservoir and the hydraulic fluid therein is pressurized and passes by the corresponding second valve to operate the brakes connected thereto, closure of the first valve serving to vent the reservoir to atmosphere to thereby release the brakes.

30. The system of claim 29 including restricting orifice means positioned between the source of compressed gas and each first valve to provide a ramp pressure increase to the appropriate brakes upon actuation of the corresponding first valve.

31. The system of claim 30 including pressure regulator means connected to said source of compressed gas.

* * * * *